US010307009B2

(12) United States Patent
Sachtleben et al.

(10) Patent No.: US 10,307,009 B2
(45) Date of Patent: Jun. 4, 2019

(54) FILTER VESSEL (71) Applicant: MELITTA EUROPA GMBH & CO. KG, Minden (DE)

(72) Inventors: Andreas Sachtleben, Minden (DE); Markus Schaefer, Blomberg (DE)

(73) Assignee: MELITTA EUROPA GMBH & CO. KG, Minden (DE)

( * ) Notice: Subject to any disclaimer, the term of this patent is extended or adjusted under 35 U.S.C. 154(b) by 0 days.

(21) Appl. No.: 15/688,832

(22) Filed: Aug. 28, 2017

(65) Prior Publication Data
US 2018/0055272 A1 Mar. 1, 2018

(30) Foreign Application Priority Data
Aug. 29, 2016 (DE) .......................... 10 2016 116 074

(51) Int. Cl.
*A47J 31/06* (2006.01)
*A47J 31/02* (2006.01)

(52) U.S. Cl.
CPC ............... *A47J 31/06* (2013.01); *A47J 31/02* (2013.01)

(58) Field of Classification Search
None
See application file for complete search history.

(56) References Cited

U.S. PATENT DOCUMENTS

| 1,357,445 | A | * | 11/1920 | De Mattei | A47J 31/0663 99/291 |
| 2,234,397 | A | * | 3/1941 | Bentz | A47J 31/06 210/455 |
| 3,334,574 | A | * | 8/1967 | Douglas | A47J 31/02 210/455 |
| 4,802,406 | A | * | 2/1989 | Bouldin | A47G 19/12 215/396 |
| 4,901,630 | A | * | 2/1990 | Hall | A47G 19/14 215/6 |
| D642,433 | S | * | 8/2011 | Tuan | D7/400 |
| D797,501 | S | * | 9/2017 | Thurlow | D7/400 |
| 2006/0278091 | A1 | * | 12/2006 | Rutigliano | A47J 31/007 99/279 |

FOREIGN PATENT DOCUMENTS

DE 26 09 606 B1 1/1977

* cited by examiner

*Primary Examiner* — Benjamin M Kurtz
(74) *Attorney, Agent, or Firm* — FisherBroyles, LLP; Robert Kinberg (57) ABSTRACT

A filter vessel for accommodating a filter insert made of water-permeable material and fillable with coffee grounds. The filter vessel includes a bottom; and side walls upwardly extending from the bottom and spreading outwardly. The bottom includes at least two openings through which a filtrate can pass. The bottom includes a separating element in a central region of the bottom. The separating element divides a region above the bottom into two approximately equal sized drainage chambers. Each drainage chamber includes at least one of the at least two openings for discharging the filtrate.

14 Claims, 10 Drawing Sheets

FILTER VESSEL

CROSS-REFERENCE TO RELATED APPLICATION

This application claims priority to German Application No. 10 2016 116 074.1, filed Aug. 29, 2016, the disclosure of which is incorporated by reference in its entirety.

BACKGROUND OF THE INVENTION

The invention relates to a filter vessel for accommodating a filter insert made of water-permeable material, which filter can be filled with coffee grounds, wherein the filter vessel has upwardly spreading side walls and a bottom on which a filtrate can drain through at least two openings.

German patent document DE 26 09 606 discloses a filter vessel for producing a filtrate, in particular coffee, wherein a filter paper insert can be inserted into the filter vessel. On the filter vessel, ribs are provided on the inner walls, which provide for a spacing of the filter paper insert from the side walls so that the filtrate can collect in a groove-shaped bottom region and be fed via a drain opening to a container. Such filter vessels have proven themselves, per se, but there is the disadvantage that the filtrate is only passed into one collecting container. If a larger amount of the coffee filtrate is prepared, for example for two persons, the coffee filtrate must first be passed into a larger intermediate container to divide it subsequently into two cups.

To increase the outflow quantity, two or more openings in the bottom area can also be provided for such filter vessels, but the flow rate at the individual discharge openings can be different. When an outlet opening is partly concealed by a filter paper insert, uniform filling of two cups cannot be guaranteed in a reproducible manner.

SUMMARY OF THE INVENTION

It is therefore an object of the present invention to provide a filter vessel for accommodating a filter insert made of water-permeable material, by which uniform filling of two containers is possible at the same time.

The above and other objects are achieved by a filter vessel for accommodating a filter insert made of water-permeable material and which is fillable with coffee grounds, the filter vessel comprising: a bottom including at least two openings through which a filtrate can pass; and side walls upwardly extending from the bottom and spreading outwardly; wherein the bottom includes a central region and a separating element in the central region of the bottom, the separating element dividing a region above the bottom into two approximately equal sized drainage chambers, and each drainage chamber including at least one of the at least two openings for discharging the filtrate.

As a result of the invention, the filtrate can flow out uniformly over both drainage chambers, so that a substantially uniform distribution of the filtrate takes place, such that two containers can be filled at the same time. For this purpose, the openings can have a spacing which allows positioning on two juxtaposed containers, but alternatively also positioning the filter vessel on only one container, if no division of the filtrate is desired. The spacing of the openings can, for example, lie in a range between 2 cm and 5 cm.

When a filter insert is inserted, a lower edge of the filter insert is supported on the separating element, so that when the filter insert is filled, the lower edge curves downwards on both sides of the separating element, and thus both drainage chambers are supplied with filtrate. The separating element is provided at the centre of the bottom, so that a uniform supply of the drainage chambers is ensured when the liquid level in the filter insert extracts the coffee grounds.

The separating element can, for example, be designed as a partition wall. Instead of a partition wall, a curvature or a separating bead can also be provided, which divides the bottom region into two drainage chambers.

The bottom is adapted to descend towards the opening in each drainage chamber. The inclination of the bottom to the horizontal can be at an angle between 3° to 30°, preferably 5° to 20°, so that a secure supply of the liquid to the opening is ensured.

To space the filter insert apart from the side walls, ribs which extend towards the bottom can be provided on the spreading side walls of the filter vessel on the inside. For the flow behaviour in the region of the side walls to ensure a uniform supply of the drainage chambers, the ribs can be arranged symmetrically to a vertical plane through the separating element.

In a further embodiment, at least one bottom rib is arranged directed from the separating element to the opening. Because of such bottom ribs, swirling of the filtrate in the region of the separating element can be avoided, wherein the separating element may be designed higher than the bottom rib to ensure support of the filter insert via the separating element.

To ensure outflow of the filtrate, a guide element for the filtrate can be provided at each opening. The guide element is, for example, designed as a web which projects into the opening and extends downwards beyond the walls at the opening so that the direction of dripping is predetermined by means of the guide element.

In one embodiment, the filter vessel has on the underside a support plate which comprises a downwardly directed edge which can serve as a stop in order to avoid a displacement of the filter vessel during the brewing. To allow verifying an exact positioning of the filter vessel on one or two containers, a cut-out or a viewing window can be provided on the support plate and/or the edge so that the positioning of the separating element or of the openings can be checked.

On the underside of the filter vessel, means for positioning can be provided, in particular downwardly directed webs, in order to be able to carry out positioning on one or two containers.

BRIEF DESCRIPTION OF THE DRAWINGS

The invention is explained in closer detail below by reference to an exemplary embodiment shown in the accompanying drawings, in which.

DETAILED DESCRIPTION OF THE INVENTION

Figure 1:
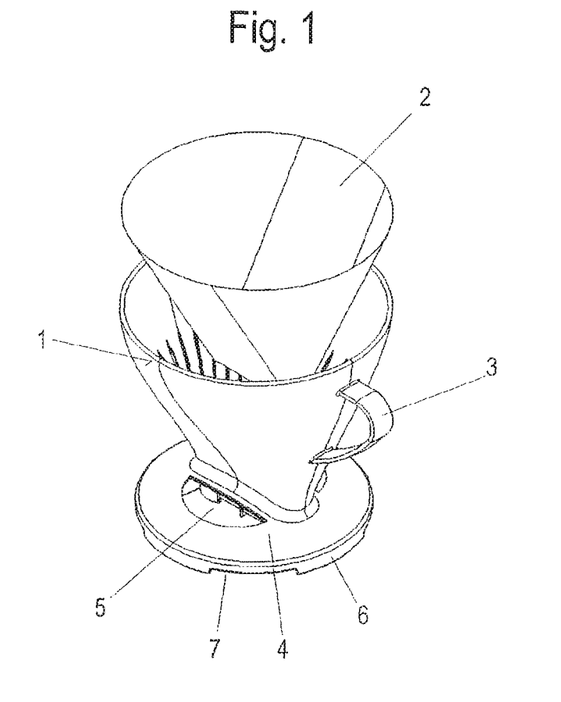
FIG. 1 is an exploded perspective view of a filter vessel according to the invention when a filter insert is inserted.

A filter vessel 1 made of ceramic, plastic, metal or another suitable material comprises an interior into which a filter insert 2 formed in the manner of a truncated cone can be inserted. The filter insert 2 consists of a water-permeable material, such as paper, wherein other filter materials such as sieves or nonwovens can also be used. The filter vessel 1 comprises a laterally protruding handle 3 for easy handling and in a lower region a support plate 4 which has a downwardly directed edge 6. A recess 5 is provided in the support plate 4, by which the exact positioning of the filter vessel 1 and the filling level in the collecting container can be checked. Instead of the recess 5, a viewing window can also be provided. In addition, a plurality of recesses 5 can also be distributed over the circumference.

Figure 2:
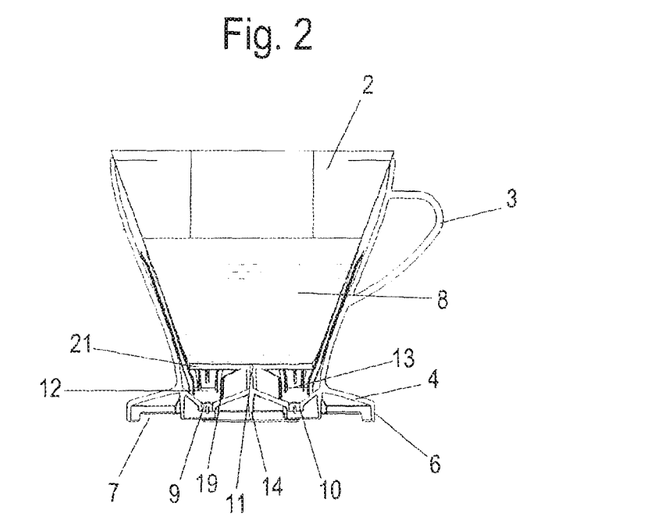
FIG. 2 is a sectional view of the filter vessel of FIG. 1 with inserted filter insert.

FIG. 2 shows the filter vessel 1 in a filled position, wherein a filter insert 2 is laterally supported on the side walls which extend obliquely upwards to spread apart. In the filter insert 2, coffee grounds 8 and hot water are provided, which extract the soluble solids from the coffee grounds. The filter insert is permeable to the thus formed filtrate, and the insoluble substances are retained in the filter insert.

A first opening 9 is located at the bottom of the filter vessel 1 and, spaced therefrom, a second opening 10 is located at a bottom. Above the openings 9 and 10, a respective drainage chamber 12 and 13 is formed, wherein the two drainage chambers 12 and 13 are divided via a separating element comprising a partition wall 11. A lower edge 21 of the filter insert 2 rests on the upper edge of the partition wall 11. The partition wall 11 is centrally arranged in the filter vessel 1 and on the filter insert 2, so that the drainage chambers 12 and 13 are supplied essentially with the same quantity of filtrate.

On the underside of the filter vessel 1 there are recesses 7 on the downwardly directed edge 6 which serve for positioning the filter vessel. In addition, between the openings 9 and 10, a downwardly projecting web 14 is arranged which extends the partition wall 11 downwards and which is visible through the recess 5 to enable positioning of the filter vessel 1 in a better manner.

Figure 3:
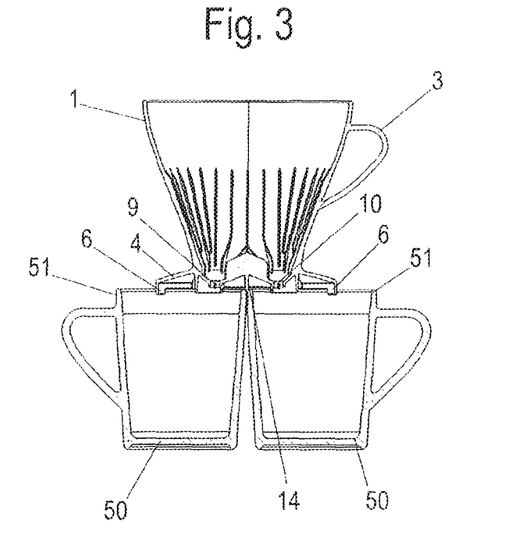
FIG. 3 is a view of the filter vessel on two containers.

In FIG. 3, the filter vessel 1 is placed on two cups 50. The filter vessel 1 rests on an upper edge 51 of the cups 50 in the region of recesses 7 on the lower edge 6. The downwardly projecting web 14 is arranged between the two cups 50, so that each cup 50 is assigned one of the openings 9 and 10.

Figure 4:
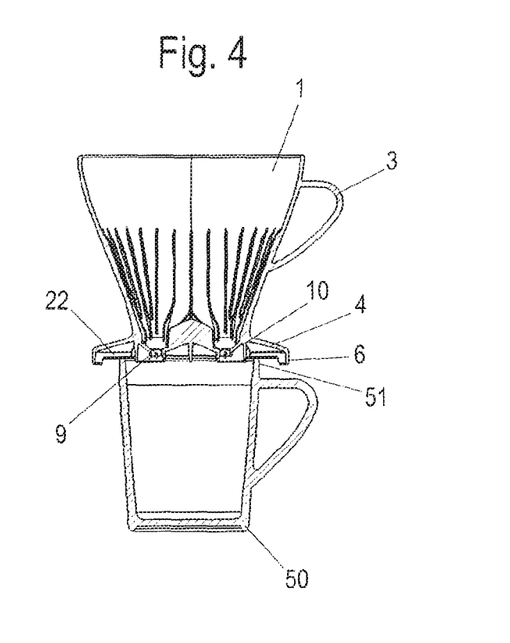
FIG. 4 is a view of the filter vessel on only one container.

In FIG. 4, the filter vessel 1 is positioned only on one cup 50, wherein the openings 9 and 10 are arranged both above the cup 50. The filter vessel is provided with webs which extend radially or approximately radially from the respective openings 9, 10 for being supported by an upper edge 51 of the cup 50.

Figure 5:
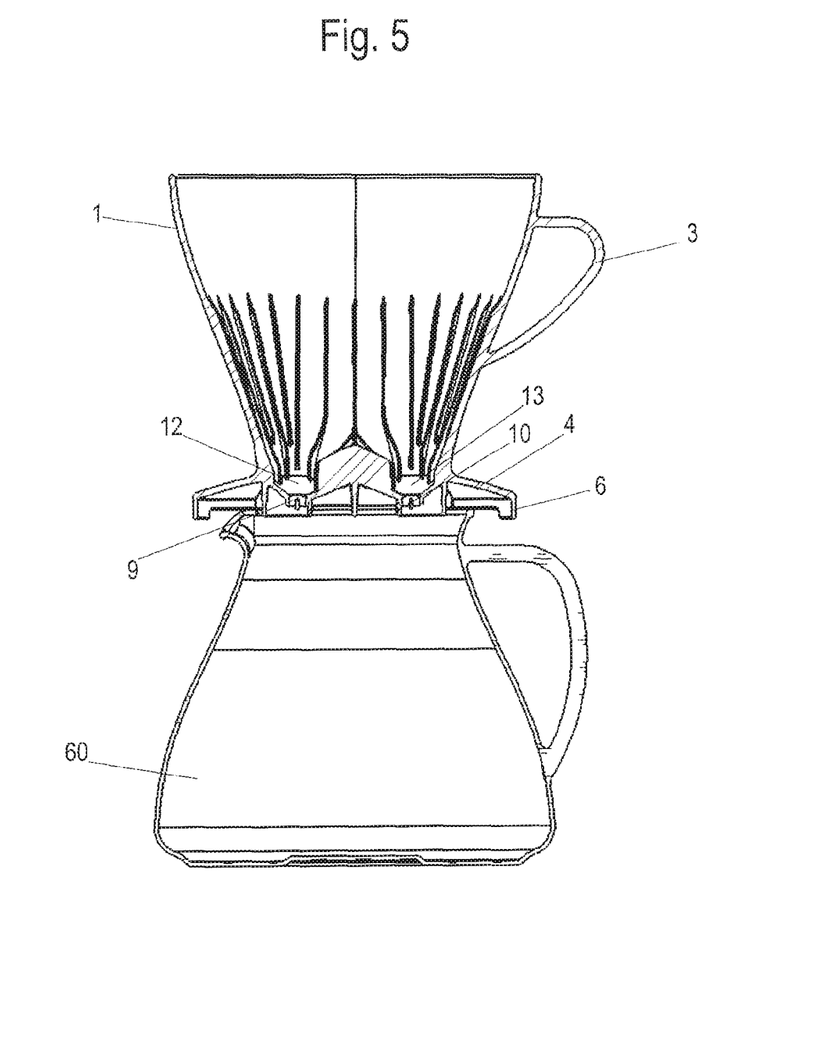
FIG. 5 is a view of the filter vessel on a pot.
Figure 6A:
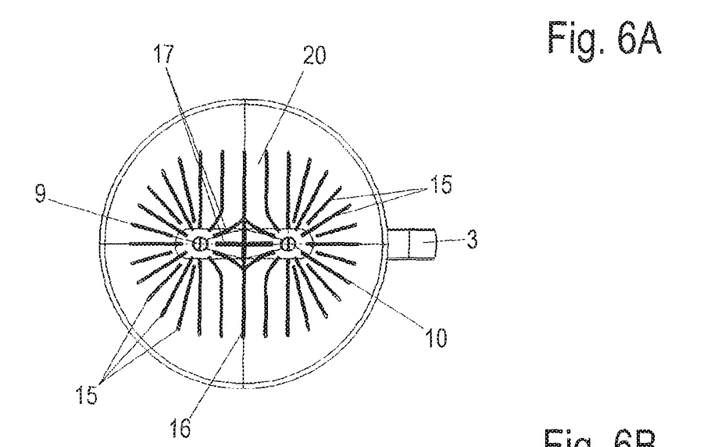
FIGS. 6A to 6D are several views of the interior region of the filter vessel.
Figure 6B:
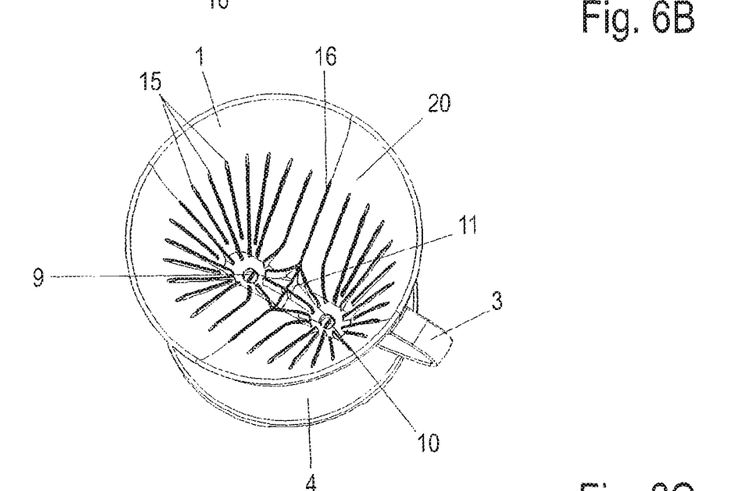
Figure 6C:
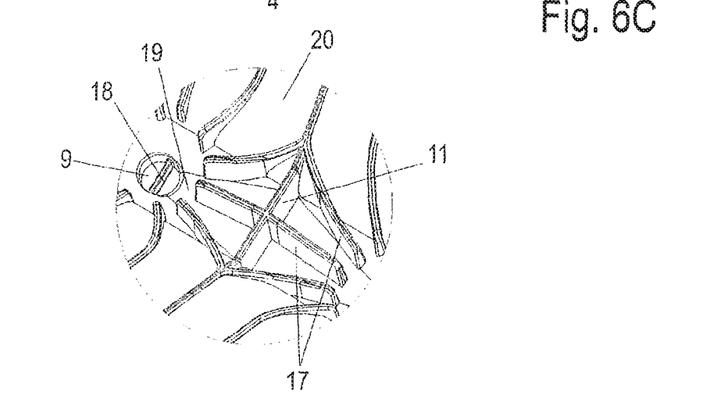
Figure 6D:
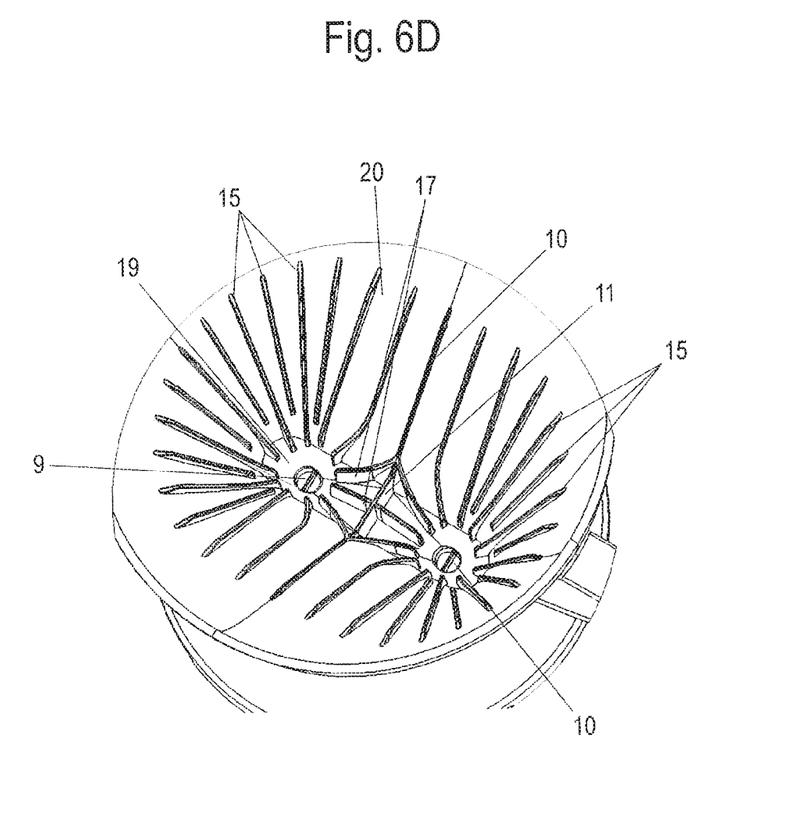

In FIG. 5, the filter vessel is positioned on a pot 60, wherein both openings 9 and 10 are arranged above an opening of the pot 60. Thus, even larger amounts of coffee can be brewed in the filter vessel 1 and collected in the pot 60.

The interior region of the filter vessel 1 is shown in detail in FIGS. 6A to 6D. Ribs 15 which extend along the side wall 20 to the openings 9 and 10 are provided on the outwardly spreading side walls 20 of the filter vessel 1. Furthermore, ribs 16 are provided on the side walls 20 in the extension of the partition wall 11. Bottom ribs 17, which extend from the partition wall 11 to the openings 9 or 10, are provided on the bottom 19 of the filter vessel. The remaining ribs 15 and bottom rib 17 are arranged symmetrically with respect to a plane through the partition wall 11 and the ribs 16, As can be seen in the enlarged view of FIG. 6C, a web-shaped guide element 18 located in the opening 9 serves to prevent a lateral drip from the opening 9. A corresponding guide element 18 is also arranged in the opening 10.

Figure 7A:
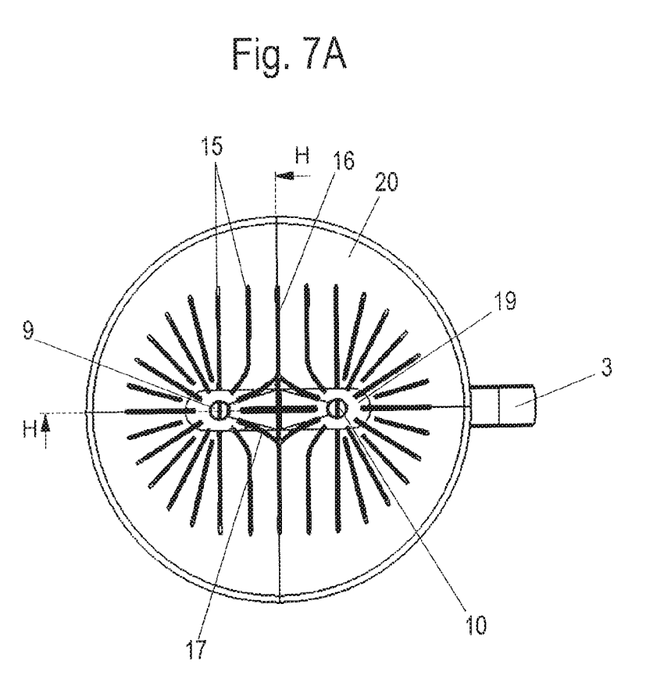
FIGS. 7A and 7B are two views of the interior region of the filter vessel.
Figure 7B:
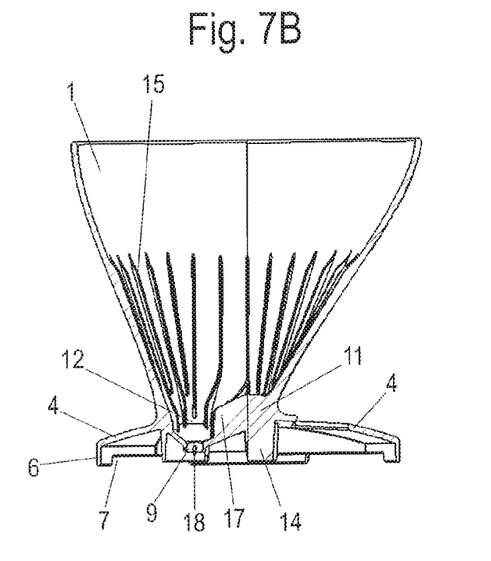

FIGS. 7A and 7B show the filter vessel, which is symmetrically formed within the side walls 20 in plan view. The ribs 15 on each side of the partition are at least partially radially aligned with a respective one of the openings 9 and 10. The bottom ribs 17 on each side of the partition wall 11 descend from the partition wall towards the respective openings 9 and 10, so that the partition wall 11 is arranged higher than the bottom ribs 17. The filter insert can be supported well in the filter vessel 1 by the ribs 15, 16 and 17.

Figure 8A:
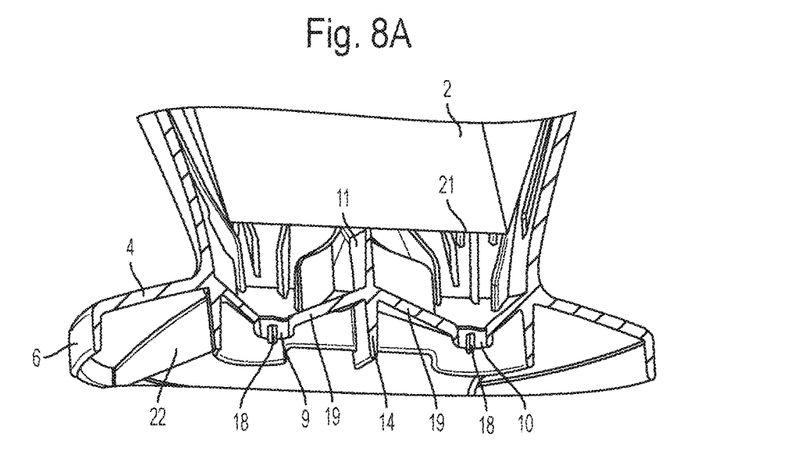
FIGS. 8A and 8B are two sectional views of the filter vessel in the lower region with inserted filter insert.
Figure 8B:
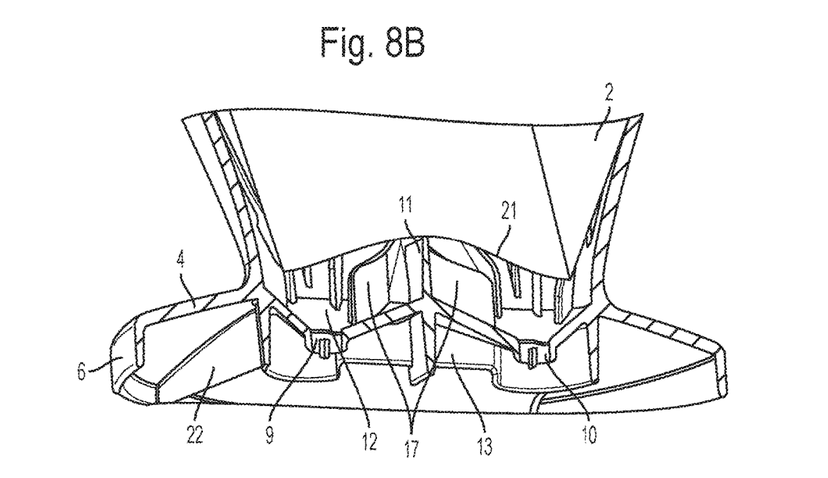

In FIG. 8A, the lower region of the filter vessel is shown with a filter insert 2, which rests with a lower edge 21 on the partition wall 11. When the filter insert 2 is filled with coffee grounds, the lower edge 21 bends downwards on either side of the separating wall 11 into the drainage chambers 12 and 13 which are arranged above the openings 9 and 10, as shown in FIG. 8B. The filter insert 2 is thus secured against slipping by the partition wall 11 and divided into two regions, which are arranged either above the drainage chamber 12 or above the drainage chamber 13.

In addition, it can be seen in FIG. 8A that the bottom 19 is arranged at an angle of between 3° and 30°, and preferably 5° to 20°, to the horizontal adjacent to the openings 9 and 10. This ensures an effective supply of the filtrate to the openings 9 and 10. A web-shaped guide element 18 is arranged in the openings 9 and 10 and extends downwards below the walls of the opening 9 or 10 in order to ensure the downward discharge of the filtrate.

Figure 9:
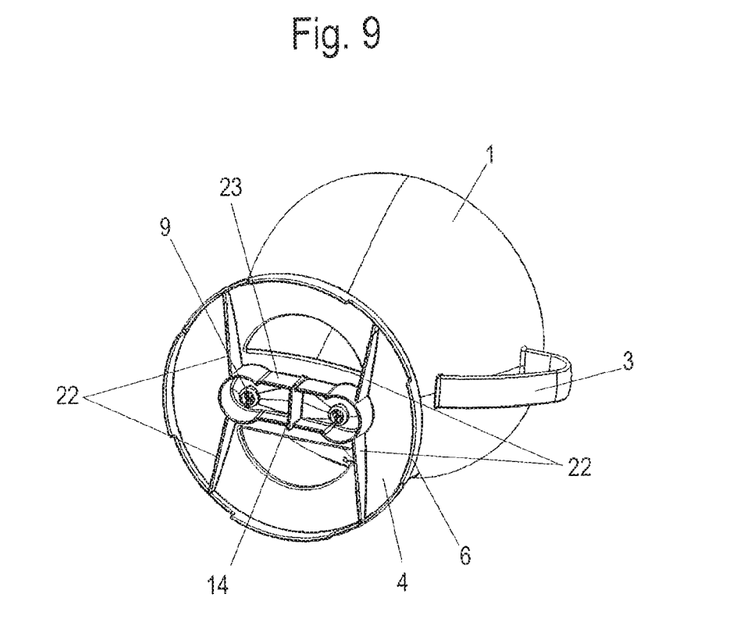
FIGS. 9 and 10 are two views of the underside of the filter vessel.
Figure 10:
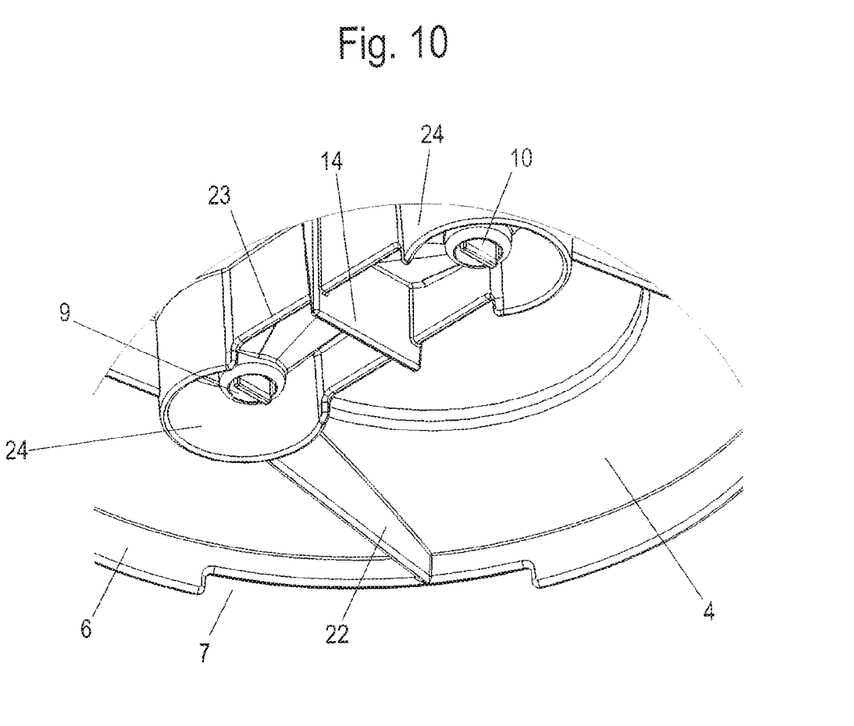

In FIGS. 9 and 10, the filter vessel 1 is shown from below, and where it can be seen that the downwardly projecting edge 6 surrounds the two openings 9 and 10 in an annular manner. Furthermore, around each opening 9 and 10 there is a downwardly projecting tubular or U-shaped rib 24, which prevents the openings 9 and 10 from being placed on a flat surface and being contaminated when the filter vessel is parked. The tubular or U-shaped rib 24 is arranged approximately at the same height as the downwardly projecting edge 6. A web 23 extends from the tubular or U-shaped rib 24 to the downwardly projecting web 14, which extends downwardly in extension of the partition wall 11. In this case, two spaced-apart parallel webs 23 connect the tubular or U-shaped rib 24 to the web 14, wherein the webs 23 are arranged slightly offset in the upwards direction and thus form a receptacle into which an edge of a container can be inserted. The height of the webs 23 corresponds approximately to the height of the projecting edge 6 in the region of the recesses 7.

Figure 11:
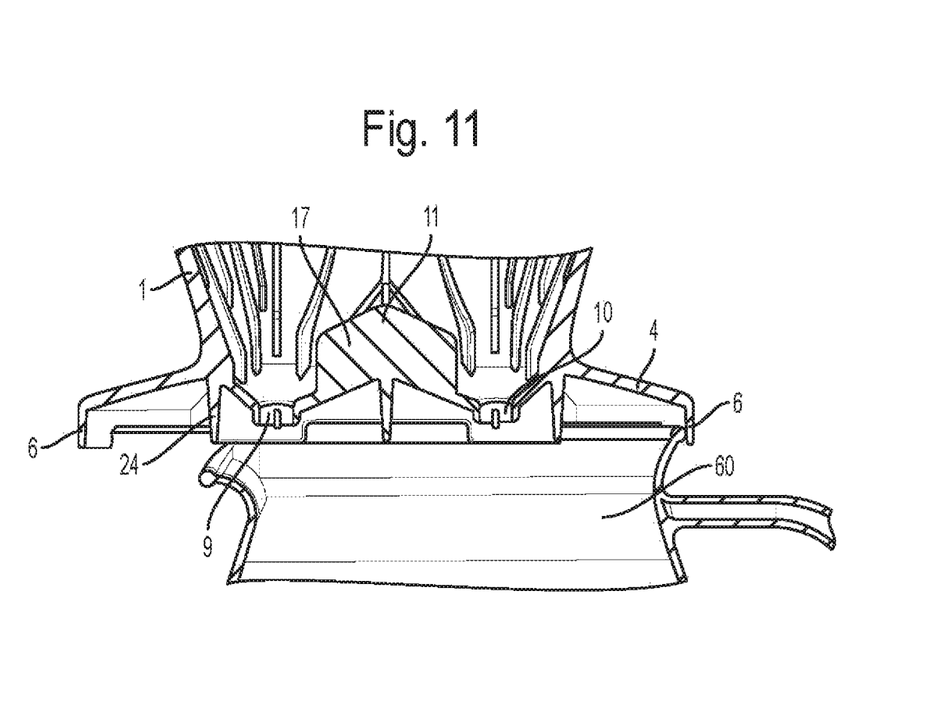
FIG. 11 is a sectional view of the lower region of the filter vessel when a pot is filled.
Figure 12:
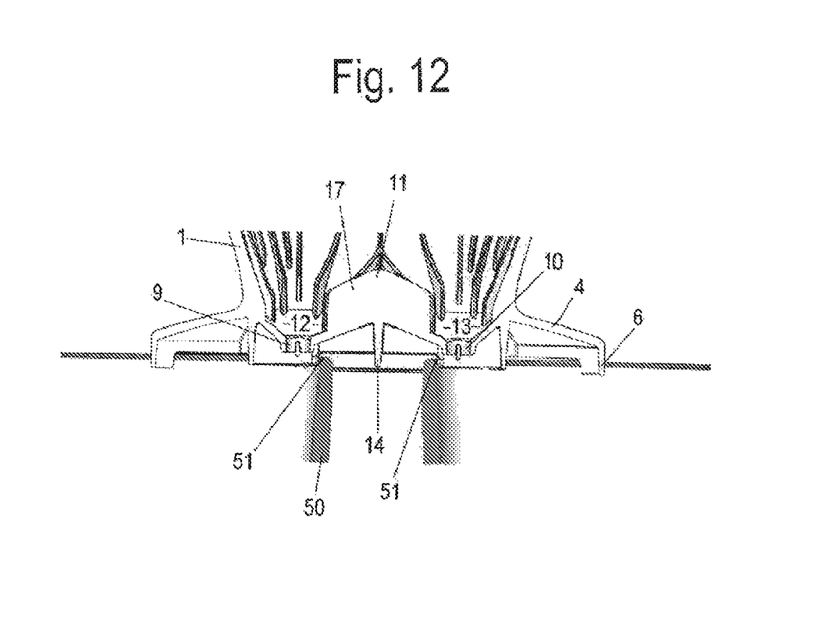
FIG. 12 is a sectional view through the filter vessel in the lower region when filling two containers.

The function of the filter vessel in the lower region is shown in FIGS. 11 and 12. In FIG. 11, the filter vessel is located on a pot 60, wherein the downwardly projecting edge 6 engages over the upper region of the pot 60 and thus prevents the filter vessel 1 from being displaced laterally from the pot 60. The edge 6 thus forms a stop against a displacement movement. The upper edge of the pot thus lies on the radial webs 22, which do not have to extend exactly radially, but are only approximately arranged radially and form a support surface of the filter vessel with respect to an upper edge of the pot 60. The webs 22 have an upper extent that is approximately at the same height as the edge 6 in the region of the recess 7 as well as the webs 23. Webs 22 each have a lower edge defining a plane and webs 23 have a lower edge in the plane defined by the lower edges of webs 22.

In FIG. 12, the filter vessel 1 is positioned on two adjacent cups 50, wherein each cup 50 is assigned an opening 9 or 10. The middle web 14 is arranged between an upper edge 51 of the cups. The upper edge 51 of the cups 50 rests on the webs 23 adjacent to the openings 9 or 10 and is also passed through the recess 7 in the edge 6 so that the filter vessel 1 is stably supported on the two cups 50. The tubular or U-shaped ribs 24, which protrude further downwards than the web 23, prevent the filter vessel 1 from being displaced in the lateral direction over the edge 51.

Figure 13:
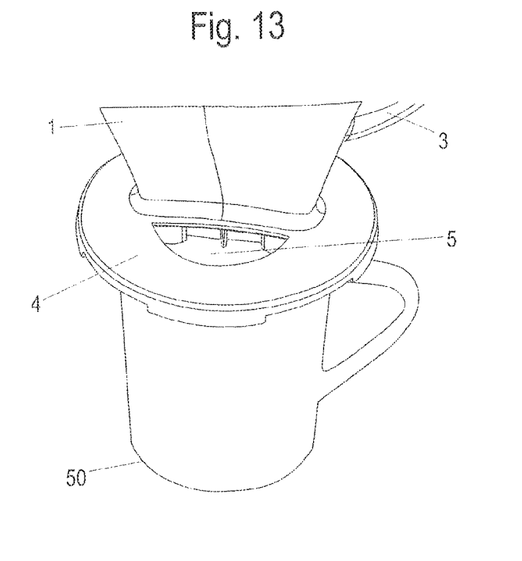
FIGS. 13 and 14 are two views of the filter vessel when filling one or two cups.

As shown in FIG. 13, when the filter vessel 1 is placed on a cup 50, it can be observed, via the recess 5, whether the openings 9 and 10 inside the tubular or U-shaped rib 24 are located above the opening of the cup 50. The webs 22 provide for a flat support of the filter vessel 1 on the edge 51 of the cup 50.

Figure 14:
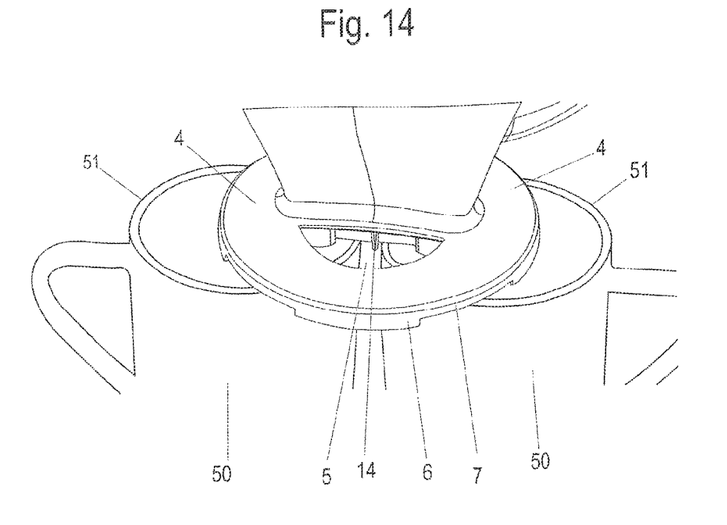

When the filter vessel is placed on two cups 50, as shown in FIG. 14, the downwardly projecting web 14 is located between the two cups 50, which can be observed through the recess 5. Furthermore, the bottom edges of the webs 22 and the webs 23 of the filter vessel are in approximately the same plane which is offset vertically upward relative to the bottom of edge 6 so that the filter vessel rests on the upper edge 51 of a cup 50 in the region of the recesses 7. Thus, in this position, the filter vessel 1 is supported evenly on the two edges 51 of the cups 50.

In the exemplary embodiment shown, a single opening 9 or 10 is associated with each drainage chamber 12 or 13. It is, of course, also possible to provide a plurality of openings 9 or 10 in each drainage chamber 12 or 13 instead of the one opening 9. However, the arrangement of a larger opening has the advantage that this can be cleaned more easily.

In addition, instead of the recess 5, a viewing window can also be provided on the support plate 4. Such a viewing window or a further recess can also be provided on opposite sides of the upwardly projecting filter vessel.

It will be understood that the above description of the present invention is susceptible to various modifications, changes and adaptations, and that the same are intended to be comprehended within the meaning and range of equivalents of the appended claims.

What is claimed is:

1. A filter vessel for accommodating a filter insert made of water-permeable material and which is fillable with coffee grounds, the filter vessel comprising
    a bottom including at least two openings through which a filtrate can pass; and
    side walls upwardly extending from the bottom and spreading outwardly;
        wherein the bottom includes a central region and a separating element in the central region of the bottom, the separating element dividing a region above the bottom into two approximately equal sized drainage chambers, and each drainage chamber including at least one opening-for discharging the filtrate; and
    wherein the filter vessel has an underside, and further including a downwardly projecting web between the at least two openings on the underside of the filter vessel, wherein the downwardly projecting web extends parallel to the separating element.

2. The filter vessel according to claim 1, wherein the separating element is adapted to support a lower edge of the filter insert when the filter insert is inserted into the filter vessel.

3. The filter vessel according to claim 1, wherein the separating element is arranged to present a partition wall between the two drainage chambers.

4. The filter vessel according to claim 1, wherein each drainage chamber has a bottom which descends towards the respective opening.

5. The filter vessel according to claim 4, wherein each bottom has an inclination relative to a horizontal line at an angle between 3° and 30°.

6. The filter vessel according to claim 1, wherein the spreading side walls of the filter vessel have an inner side that includes ribs extending towards the bottom.

7. The filter vessel according to claim 6, wherein the ribs are arranged symmetrically to a vertical plane through the separating element.

8. The filter vessel according to claim 1, wherein each drainage chamber includes at least one bottom rib extending from the separating element towards the at least one opening in each drainage chamber.

9. The filter vessel according to claim 8, wherein the separating element has a height higher than the at least one bottom rib extending from the separating element in each drainage chamber.

10. The filter vessel according to claim 1, further including a guide element for the filtrate disposed in each opening.

11. The filter vessel according to claim 1, wherein the filter vessel has an underside including a support plate having a downwardly facing edge.

12. The filter vessel according to claim 11, wherein the support plate and/or the edge has a recess or a viewing window.

13. A filter vessel according to claim 1, wherein the underside further includes at least two approximately radially oriented support webs, relative to one of the openings, and having lower edges defining a plane, the underside further including at least one web adjoining the downward projecting web and having a lower edge vertically offset upwardly relative to the downwardly projecting web between the two openings and located in the same plane as the lower edges of the two approximately radially oriented webs.

14. The filter vessel according to claim 1, wherein the filter vessel has an underside, and further including a tubular or U-shaped rib arranged around each opening on the underside of the filter vessel.

* * * * *